Sept. 4, 1934.   G. T. JOHNSON   1,972,145
WOODWORKING MACHINE
Filed June 3, 1932

Inventor
Gustave T. Johnson,
By Cromwell, Greist & Harden
attys.

Patented Sept. 4, 1934

1,972,145

UNITED STATES PATENT OFFICE 1,972,145

WOODWORKING MACHINE

Gustave T. Johnson, Beloit, Wis., assignor to Yates-American Machine Company, Beloit, Wis., a corporation of Delaware Application June 3, 1932, Serial No. 615,123

2 Claims. (Cl. 144—49)

In the operation of high speed motor driven woodworking and similar machines, the employment of frequency changers whereby to step up the frequency of the current from a power line of say 60 cycles to attain a speed for example of 18,000 to 20,000 R. P. M. of the motor, is accomplished by a very considerable vibration, the transmission of which to the motor and work table must be prevented.

It has been customary, on this account, to mount the frequency changer upon a support separate from the frame of the machine, notwithstanding its undesirability from the standpoints of compactness, convenience, expense, space, etc.

The object of the present invention is the utilization of the hollow frame of the machine itself as a housing for the frequency changer, rendered possible by so supporting the speed changer by the frame as to absorb the vibration and prevent its transference to the motor and other working parts.

In order to facilitate an understanding of the invention, an embodiment of the same in a woodworking machine, such as a router, is illustrated by way of example in the accompanying drawing and set forth in the description following; it being understood that other high speed machines may with equal advantage be equipped with the invention.

Figure 1:
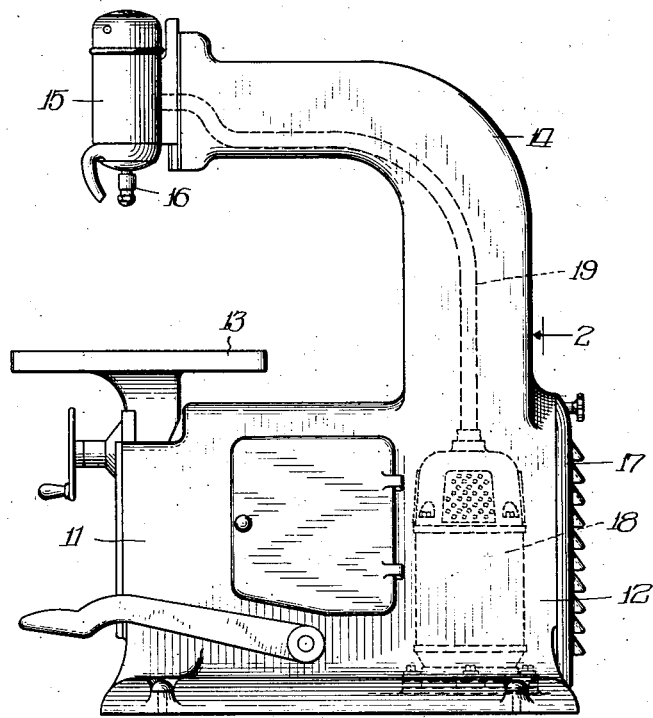
Fig. 1 represents a side elevation of a typical woodworking machine of the router type.

Referring to the drawing, the reference numeral 11 designates the frame of the machine having a hollow base 12 which carries a work table 13 and which has an overhanging hollow arm 14 by which is supported above the work table 13 the electric motor 15 for directly driving the tool-carrying spindle 16. Inasmuch as the details of the machine form of themselves no part of the present invention, this general description of the same will suffice.

Access is had to the hollow base of the machine by an opening fitted with the removable closure plate 17 and within the hollow base of the machine accessible through such opening is mounted, in the motor circuit, the frequency changer 18, the connection of the same with the motor being by means of the flexible cable 19.

Figure 2:
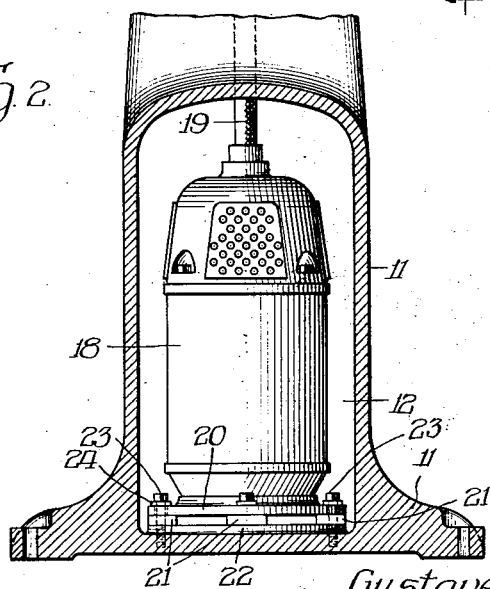
Fig. 2 is a vertical section on the line 2—2 of Fig. 1 showing the frequency changer in elevation.
Figure 3:
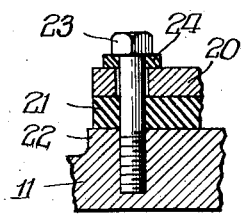
Fig. 3 is a fragmentary detail on a larger scale of a portion of the resilient mounting.

The frequency changer 18 is laterally spaced from the machine frame, as most clearly shown in Fig. 2, and its base 20 rests upon rubber pads 21 which in turn are supported by the metal base 22 resting upon the bottom of the machine base. Bolts 23 pass loosely through the base 20 of the frequency changer and rubber pads 24 are disposed between the bolt heads 23 and the base 20. Thus it will be seen that the base 20 of the frequency changer is resiliently supported above and below by rubber pads out of contact with the metal of the frame and also laterally out of contact with said frame; whereby vibration in the frequency changer is completely absorbed and transmission of such vibration to the frame or to the motor is effectually precluded. The above described assembly of the machine and its working parts with the frequency changer presents a very compact arrangement, unitary in character, economical of floor space, no exposed electrical connections; and disassociated from disadvantageous transmission of vibration from one part to the other.

I claim:

1. In a high speed woodworking machine including a frame having a hollow base forming a support for a rigidly mounted electric motor and driven working parts, a frequency changer in the motor circuit mounted within the hollow base and flexibly connected with the motor, and means for resiliently supporting the frequency changer out of direct contact with the frame.

2. In a high speed woodworking machine including a frame having a hollow base forming a support for a rigidly mounted electric motor and driven working parts, a frequency changer in the motor circuit mounted within the hollow base and flexibly connected with the motor, and means for resiliently supporting the frequency changer out of direct contact with the frame, said means comprising rubber pads interposed between the base of the frame and the base of the frequency changer.

GUSTAVE T. JOHNSON.